US005566438A

United States Patent [19]

Bullock

[11] Patent Number: 5,566,438

[45] Date of Patent: Oct. 22, 1996

[54] TOOL FOR RECONNECTING A FUEL HOSE SAFETY BREAK AWAY

[76] Inventor: Rothel J. Bullock, 11509 DeHam Dr., Louisville, Ky. 40241

[21] Appl. No.: 373,104

[22] Filed: Jan. 17, 1995

[51] Int. Cl.[6] .................................................. B23P 19/04

[52] U.S. Cl. ............................ 29/237; 29/268; 81/426.5; 81/423

[58] Field of Search ............................ 29/268, 237, 234, 29/235, 282, 280, 255; 81/423, 424.5, 426, 426.5, 418

[56] References Cited

U.S. PATENT DOCUMENTS

| | | | |
|---|---|---|---|
| 753,456 | 3/1904 | Weidinger | 81/423 |
| 3,176,551 | 4/1965 | Hansen . | |
| 3,192,805 | 7/1965 | Manning . | |
| 3,299,496 | 1/1967 | Christensen . | |
| 3,722,065 | 3/1973 | Harris | 29/237 |
| 3,726,122 | 4/1973 | Dawson | 29/237 |
| 3,845,538 | 11/1974 | Demler, Sr. . | |
| 4,170,125 | 10/1979 | Minka | 29/237 |
| 4,257,135 | 3/1981 | Moebius | 29/237 |
| 4,483,056 | 11/1984 | Schwalm et al. | 29/237 |
| 4,757,588 | 7/1988 | Churchich . | |
| 4,893,393 | 1/1990 | Marshall . | |
| 5,277,089 | 1/1994 | McGushion | 29/268 |

*Primary Examiner*—Robert C. Watson

*Attorney, Agent, or Firm*—Middleton & Reutlinger; James C. Eaves, Jr.

[57] ABSTRACT

A tool for reconnecting a fuel hose safety break away. Various geometry safety break aways are attached to various diameter fuel hoses, typically above a person's head. These safety break aways separate if a vehicle drives away from a fuel pump with the fuel nozzle still attached to the vehicle. The tool of the present invention assists the person having to reconnect the two halves of the safety break away. While individual tools for various geometry safety break aways and different hose diameters can be made, so that a service station does not have to obtain several different tools for their various fuel pumps, the tool of the preferred embodiment has a plurality of user selectable jaws, the jaws having hose engaging portions with similar geometry to the hoses they are to engage. Further, the tool is adjustable, for example, using a channel lock type configuration for the two members, so that the jaws can be moved closer together or further apart to be the proper spacing for the particular safety break away being reconnected. The selected jaws can be securely retained by the members.

9 Claims, 3 Drawing Sheets

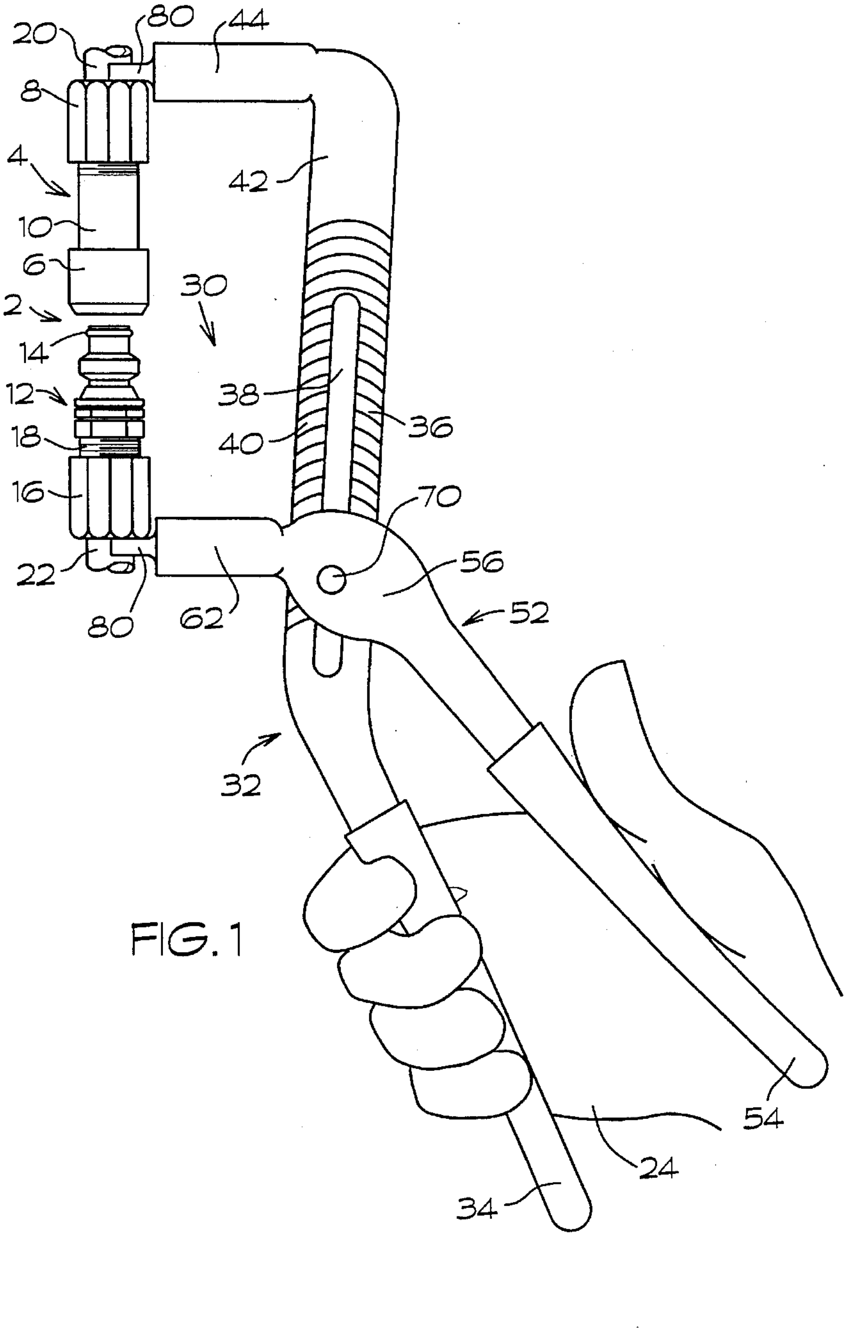
FIG. 1
FIG. 2
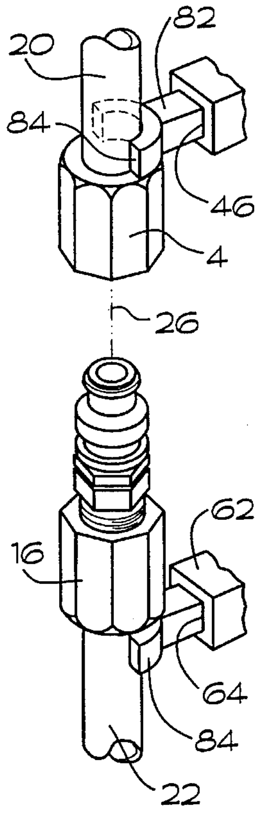

TOOL FOR RECONNECTING A FUEL HOSE SAFETY BREAK AWAY

BACKGROUND OF THE INVENTION (a) Field of the Invention

The present invention relates to a tool for reconnecting a fuel hose safety break away. At a filing station, if a vehicle operator drives away from a fuel pump with the fuel nozzle still attached to the vehicle, two halves of a safety break away will separate, permitting the nozzle and a nozzle end portion of the safety break away and fuel hose therebetween to stay with the vehicle, while a hose end portion of the safety break away remains attached to the hose from the pump, the hose end portion of the break away cutting off possible fuel flow. The tool of the instant invention aids a person in reconnecting the two portions of the safety break away to restore the fuel pump to operation.

(b) Description of the Prior Art

U.S. Pat. No. 4,893,393, to Marshall, teaches a pipe fitting assembly tool having a pair of clamps attachable to two pieces of pipe, the clamps being attached to the ends of two pivotally connected scissor-type handles for moving the clamps, and thus the pipes, together or apart.

U.S. Pat. No. 4,757,588, to Churchich, teaches push-on hose pliers, the pliers having a jaw to engage a fitting and a second hose grasping jaw for locking in place on a hose.

U.S. Pat. No. 3,845,538, to Demler, Sr., teaches a hand tool for assembling tubular connecting devices. U.S. Pat. No. 3,299,496, to Christensen, teaches a tool for coupling hydraulic hoses.

U.S. Pat. No. 3,192,805, to Manning, teaches adjustable channel lock type pliers. U.S. Pat. No. 3,176,551, to Hansen, teaches pliers having different shaped jaws which can be used therewith.

SUMMARY OF THE INVENTION

The present invention is for a tool for reconnecting a fuel hose safety break away. Various geometry safety break aways are attached to various diameter fuel hoses, typically above a person's head. These safety break aways separate if a vehicle drives away from a fuel pump with the fuel nozzle still attached to the vehicle. The tool of the present invention assists the person having to reconnect the two halves of the safety break away.

While individual tools for various geometry safety break aways and different hose diameters can be made, so that a service station does not have to obtain several different tools for their various fuel pumps, the tool of the preferred embodiment has a plurality of user selectable jaws, the jaws having hose engaging portions with similar geometry to the hoses they are to engage. Further, the tool is adjustable, for example, using a channel lock type configuration for the two members, so that the jaws can be moved closer together or further apart to be the proper spacing for the particular safety break away being reconnected. The selected jaws can be securely retained by the members.

Finally, the present invention comprises a tool for reconnecting a hose end and a nozzle end of a fuel hose safety break away so that a fuel may flow therethrough, the hose end being connected to a pump hose having a first geometry and the nozzle end being connected to a nozzle hose having a second geometry, the tool including: at least a first and a second receivable jaw, the first and second jaw having a hose engaging portion, the hose engaging portion connected to a shaft, the hose engaging portion of the first jaw having a first shape to receive at least a portion of the pump hose first geometry and to abut the hose end of the safety break away, the hose engaging portion of the second jaw having a second shape to receive at least a portion of the nozzle hose second geometry and to abut the nozzle end of said safety break away; a first member and a second member, the first and second members having a pivotal connection therebetween, the first member having a first end and a second end, the second member having a first end and a second end, the first ends of the first and second members being a handle portion, the second end of said first member including means for receiving the shaft of the first receivable jaw, and the second end of the second member including means for receiving the shaft of the second receivable jaw, the first receivable jaw shaft being received by the first member shaft receiving means and the second receivable jaw shaft being received by the second member shaft receiving means.

BRIEF DESCRIPTION OF THE DRAWINGS

A better understanding of the present invention will be had upon reference to the following description in conjunction with the accompanying drawings, wherein:

FIG. 1 shows a perspective view from the side of a tool of the preferred embodiment as it would be used to reconnect the two ends of a first type safety break away;

FIG. 2 shows a perspective view from above showing the jaws of a tool of the preferred embodiment as the tool would be used to reconnect the two ends of a second type safety break away;

DETAILED DESCRIPTION OF THE PREFERRED EMBODIMENT

Figure 4:
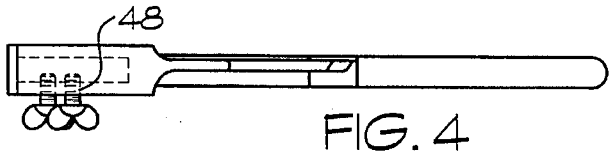
FIG. 4 shows a top view of the tool of FIG. 3.

The present invention relates to a tool 30, 300, or 330 for reconnecting a fuel hose safety break away 2. With reference to FIG. 1, break away 2 is shown having a hose end 4 and a nozzle end 12. Hose end 4 is connected to the hose 20, which is connected to a fuel pump (not shown). With fuel pumps of today, the fuel hose often originates about six or more feet above the ground. Hose end 4 is typically placed at about this height. Therefore, to insert nozzle end 12 into hose end 4, a person typically would have to work above his head or would have to get on a ladder. Reconnecting ends 12 and 4 requires force, particularly because the hose end 4 has a fuel flow stop valve which has fuel back pressure on it. This fuel flow stop valve must be opened to reactivate the fuel pump.

Hose end 4 is shown having a female portion 6, a hose connecting fitting 8, and an intermediate portion 10 therebetween. Nozzle end 12 is shown having a male portion 14, engageable with female portion 6 of hose end 4. Nozzle end 12 also has a hose connecting fitting 16 and an intermediate portion 18 between portion 14 and fitting 16. Hose connecting fitting 16 is attached to hose 22 which goes to the fuel dispensing nozzle (not shown).

Several manufacturers make safety break aways, for example, Husky, Catlow, OPW, Richards Industries, and Emco Wheaton. The geometry of each break away varies. For example, FIG. 2 shows a break away where the hose end 4 combines the female portion and hose connecting fitting into a single component. Ends 4 and 12 coaxially align along axis 26. While a tool of specific dimension could be made for each break away, to make a universal tool to fit break aways of differing lengths, tool adjustability is required.

Figure 6:
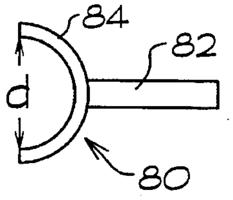
FIG. 6 shows a top view of a jaw useable with a tool for reconnecting the two ends of a safety break away.

Further, fuel hoses, such as hoses 20/22, vary in diameter. For example, a standard gasoline hose without vapor recovery is about ¾ inch in diameter; a standard gasoline hose with vapor recovery is about ⅞ inch in diameter; a standard diesel hose is about one inch in diameter. A ⅝ inch diameter hose is also sometimes used. Therefore, while a tool with jaws of specific diameter could be made for each hose type, to make a universal tool to fit hoses of differing diameter, tool jaw adjustability is required. So, as shown in FIG. 6, a plurality of pairs of jaws 80 can be provided, each jaw 80 having a hose engaging portion 84 having a desired diameter, identified by the letter "d".

Figure 3:
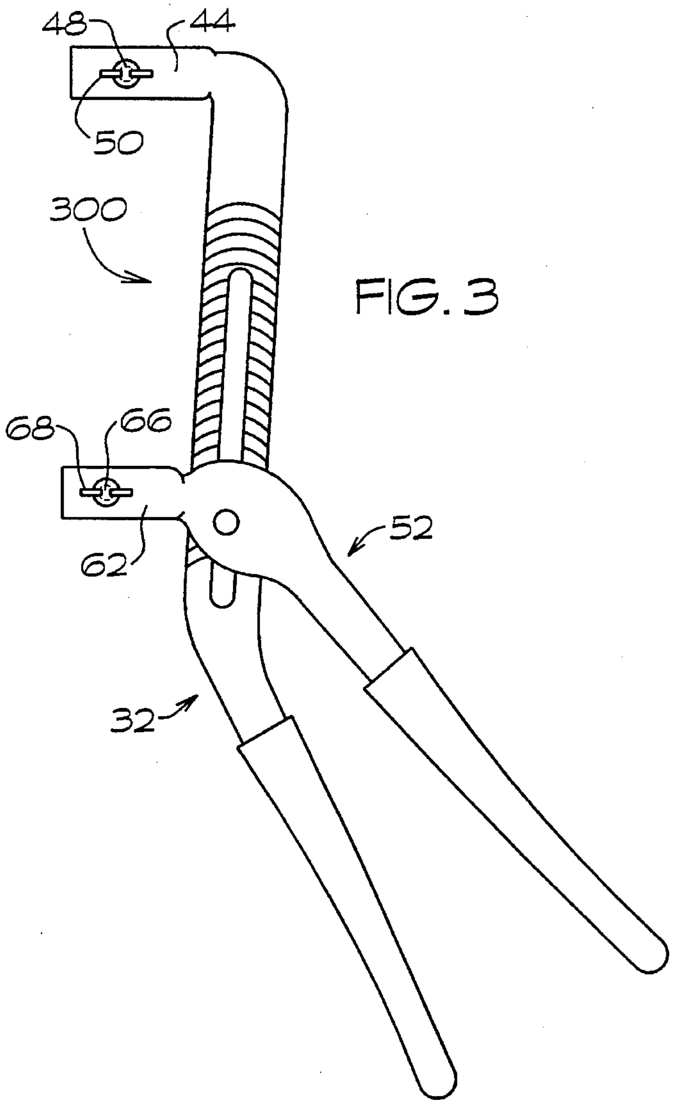
FIG. 3 shows a side view of a tool of a second preferred embodiment.
Figure 5:
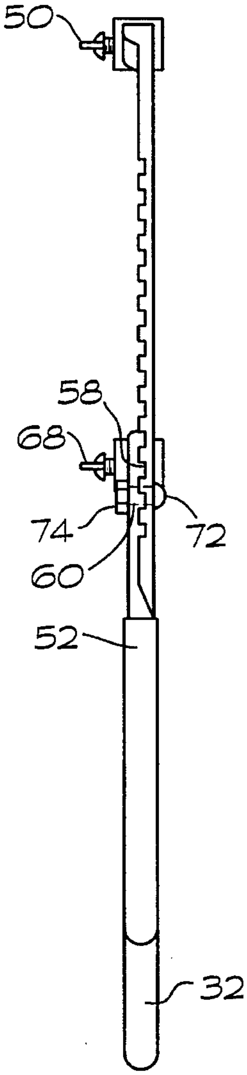
FIG. 5 shows a back view of the tool of FIG. 3.
Figure 7:
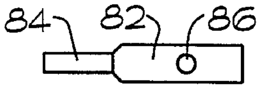
FIG. 7 shows a side view of the jaw of FIG. 6.
Figure 8:
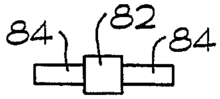
FIG. 8 shows a rear view of the jaw of FIG. 6.
Figure 9:
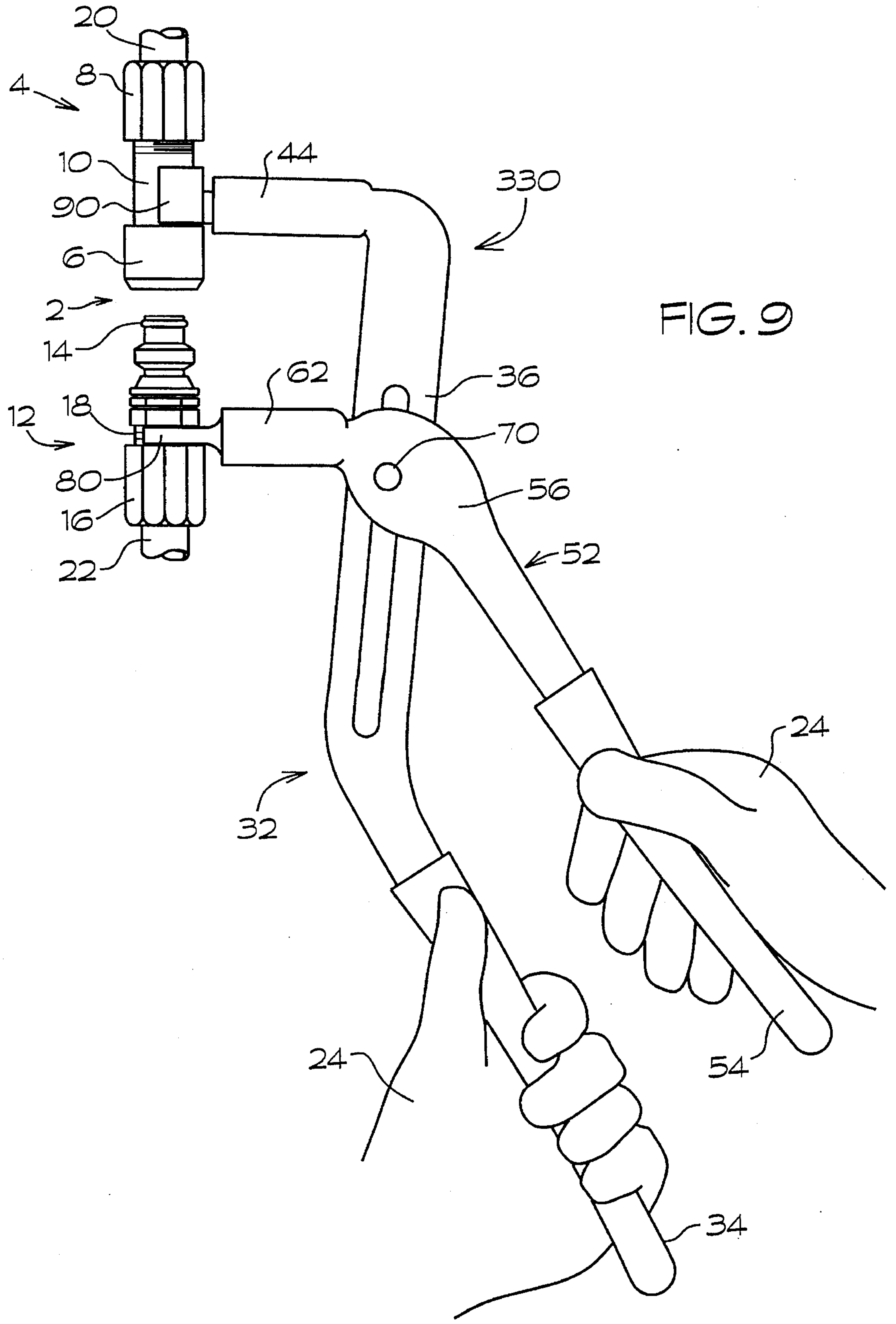
FIG. 9 shows a perspective view from the side of a tool of a third preferred embodiment.

With reference to FIGS. 1 and 2, a preferred embodiment tool 30 is shown. With reference to FIGS. 3–5, a second preferred tool 300 is shown. FIGS. 6–8 show a preferred jaw 80. FIG. 9 shows a third preferred tool 330. Tools 30, 300, 330 and jaws 80 can be made of various materials having sufficient strength for the tool's intended use. Examples are a polycarbonate thermoplastic, aluminum, or steel.

Tool 30 is shown having a pair of jaws 80. Jaws 80 are removably received by tool 30, so that jaws of different desired diameter or shape can be inserted into tool 30 for use with hoses of different diameters. Tool 30 is also adjustable, in that the pair of jaws 80 can be moved closer together or further apart. The ability to use different jaws and the ability to adjust the spacing between jaws permits tool 30 to be a universal tool, in that, for example, a pair of jaws 80 with diameter ("d") of 1 inch could be inserted into tool 30 and the jaws could be spaced to reconnect a break away for a diesel fuel pump or a pair of jaws with diameter ("d") of ¾ inch could be inserted into tool 30 and the jaws could be spaced to reconnect a break away for a non-vapor recovery gasoline fuel pump. Adjustability of tool 30 is accomplished in a way similar to a that of a "channel-lock" pliers, although other adjustment means can be employed.

Tool 30 has a first member 32, a second member 52, and a member connector 70. Each member 32/52 receives a jaw 80.

First member 32 has a handle portion 34, an adjustment portion 36, an extended portion 42, and a jaw receiving portion 44. Adjustment portion 36 includes an adjustment slot 38 and a plurality of channels 40 therealong. Jaw receiving portion 44 has an opening 46 thereinto for receiving shaft 82 of an upper jaw 80.

Second member 52 has a handle portion 54, an adjustment portion 56, and a jaw receiving portion 62. Adjustment portion 56 includes a channel engaging portion 58 and a bore 60 therethrough. Jaw receiving portion 62 has an opening 64 thereinto for receiving shaft 82 of a lower jaw 80.

Member connector 70 can be, for example, a threaded pin 72 with enlarged pin head and a nut 74. Threaded pin 72 passes through first member 32's adjustment slot 38 and through second member 52's bore 60 and nut 74 retains members 32/52 in a desired relationship, such that channel engaging portion 58 can securely engage a desired channel 40, or, by moving handles 34/54 apart to disengage channel engaging portion 58 from any channel 40, member connector 70 permits second member 52 to move so that channel engaging portion 58 can be securely engaged with a different channel 40. Other known means for connecting members 32/52 can be employed.

As shown, adjustment portion 36 and extended portion 42 of first member 32 permit jaws 80 to be spaced up to about 8 inches apart. Extended portion 42 dictates how close together jaws 80 can be placed, for example, about 3 inches apart.

The tool 30 of FIGS. 1 and 2 simply has the shaft 82 of upper and lower jaws 80 slidably received into respective openings 46 and 64. The tool 300 of FIGS. 3–5 is the same as tool 30, but with the additional feature that means for securely retaining jaws 80 in openings 46/64 is provided. With reference to FIG. 7, shaft 82 of jaw 80 is shown having an indentation 86 therein. Jaw receiving portions 44/62 of members 32/52 have a threaded bore 48/66, respectively, thereinto. When jaws 80 are inserted into openings 46/64, respective screws 50/68, for example, screws having winged heads for hand tightening, inserted into respective threaded bores 48/66 can be tightened to engage jaw 80 indentations 86 to secure the jaws 80 within the openings 46/64. Screws 50/68 can be loosened to replace one sized jaw 80 with another sized jaw 80.

FIG. 9 is a simplified diagram of a tool 330. Tool 330 does not have the long extended portion 42 as do tools 30 and 300. Therefore, if a similar adjustment slot 38 is employed, the jaw range of movement with respect to each other is similar, but the jaws can not be spaced as far apart as with tools 30, 300. However, tool 330 is designed so that the upper and lower jaws do not engage the interface between hose 20 and hose connecting fitting 8 and the interface between hose 22 and hose connecting fitting 16. Rather, tool 330's jaws engage intermediate portions 10 and 18. Therefore, the jaws do not need to be spaced as far apart as with tools 30 and 300. However, identical jaw pairs 80 employed with tools 30, 300 may not interface properly, as intermediate portions 10 and 18 may have different geometric parameters. Therefore, FIG. 9 shows a lower jaw 80, as used with tool 30, 300. However, a different sized jaw 90 is used for the upper jaw to properly interface hose end 4's intermediate portion 10. Therefore, tools 30 and 300 are the preferred tools, as hose diameters should be maintained as a more standard dimension than the intermediate portions of a unique manufacturer's break away.

While tool 330 is shown being operated with two hands 24, the one hand 24 use of FIG. 1 is preferred for any of the tools 30, 300, 330.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A tool for reconnecting a hose end and a nozzle end of a fuel hose safety break away so that a fuel may flow therethrough, the hose end being connected to a pump hose having a first geometry and the nozzle end being connected to a nozzle hose having a second geometry, the tool comprising:

a. at least a first and a second receivable jaw, said first and said second jaw having a hose engaging portion having a semi-circular shape, said hose engaging portion connected to a shaft, said hose engaging portion of said first jaw having a first shape to receive at least a portion of said pump hose first geometry and to abut said hose end of said safety break away, said hose engaging portion of said second jaw having a second shape to receive at least a portion of said nozzle hose second geometry and to abut said nozzle end of said safety break away;

b. a first member having a handle portion at a first end and a jaw receiving portion at a second end, said handle portion having an adjustment portion connected thereto, said adjustment portion having an extended portion thereto, said extended portion being connected to said jaw receiving portion; said adjustment portion having an adjustment slot therein, said adjustment slot having a preselected first length, said adjustment slot having a plurality of channels therealong; said extended portion having a preselected second length; said jaw receiving portion having a first opening thereinto; said first receivable jaw shaft being received by said first opening;

c. a second member having a handle portion at a first end and a jaw receiving portion at a second end, said handle portion and said jaw receiving portion having an adjustment portion connected therebetween, said adjustment portion having a bore therethrough and a channel engaging portion; said jaw receiving portion having a second opening thereinto; said second receivable jaw shaft being received by said second opening; and, d. means for pivotally connecting said first member and said second member, said connecting means received by said bore in said second member adjustment portion and by said adjustment slot in said first member adjustment portion, where said connecting means may be moved in said adjustment slot to a preselected location so that said channel engaging portion of said second member may be engaged with a desired at least one of said plurality of channels of said first member, thereby placing said first jaw and said second jaw in a desired spaced apart relationship.

2. The tool of claim 1, further comprising means for securing said first receivable jaw shaft in said first opening and means for securing said second receivable jaw shaft in said second opening.

3. The tool of claim 2, where said first receivable jaw shaft securing means comprises an indentation in said first receivable jaw shaft, a threaded bore into said first opening, and a threaded member, said threaded member being threadably received by said threaded bore and engageably received by said indentation and where said second receivable jaw shaft securing means comprises an indentation in said second receivable jaw shaft, a threaded bore into said second opening, and a threaded member, said threaded member being threadably received by said threaded bore and engageably received by said indentation.

4. The tool of claim 1, where said hose engaging portions of said first jaw and said second jaw have a diameter of ¾ inch.

5. The tool of claim 1, where said hose engaging portions of said first jaw and said second jaw have a diameter of ⅞ inch.

6. The tool of claim 1, where said hose engaging portions of said first jaw and said second jaw have a diameter of one inch.

7. The tool of claim 1, where said at least a first and a second receivable jaw comprises at least three pairs of receivable jaws, a first pair having hose engaging portions having a diameter of ¾ inch, a second pair having hose engaging portions having a diameter of ⅞ inch, and a third pair having hose engaging portions having a diameter of one inch, whereby a user of said tool selects a desired one of said pairs of receivable jaws.

8. The tool of claim 1, where said preselected first length of said adjustment slot is approximately five inches and where said preselected second length of said extended portion is approximately three inches.

9. The tool of claim 1, where said first member, said second member, said first receivable jaw, and said second receivable jaw are a material selected from the group consisting of polycarbonate thermoplastic, aluminum, and steel.

* * * * *